US012618776B2

(12) United States Patent
Xia et al.

(10) Patent No.: US 12,618,776 B2
(45) Date of Patent: May 5, 2026

(54) MULTI-FLUORESCENCE IMAGE ACQUISITION SYSTEM AND METHOD, AND APPLICATION

(71) Applicant: SHANGHAI RUIYU BIOTECH CO., LTD., Shanghai (CN)

(72) Inventors: Haohan Xia, Shanghai (CN); Yanfang Chen, Shanghai (CN)

(73) Assignee: SHANGHAI RUIYU BIOTECH CO., LTD., Shanghai (CN)

( * ) Notice: Subject to any disclaimer, the term of this patent is extended or adjusted under 35 U.S.C. 154(b) by 167 days.

(21) Appl. No.: 18/520,604

(22) Filed: Nov. 28, 2023

(65) Prior Publication Data

US 2024/0094127 A1 Mar. 21, 2024

Related U.S. Application Data

(63) Continuation of application No. PCT/CN2022/095784, filed on May 27, 2022.

(30) Foreign Application Priority Data

May 28, 2021 (CN) .......................... 202110593167.3

(51) Int. Cl.
*G01N 21/64* (2006.01)

(52) U.S. Cl.
CPC ..... *G01N 21/6456* (2013.01); *G01N 21/6428* (2013.01); *G01N 2201/06113* (2013.01); *G01N 2201/0636* (2013.01)

(58) Field of Classification Search
CPC ........... G01N 21/6456; G01N 21/6428; G01N 2201/06113; G01N 2201/0636;
(Continued)

(56) References Cited

U.S. PATENT DOCUMENTS

2005/0092934 A1 5/2005 Kang et al.
2017/0034456 A1* 2/2017 Kyung ................ H10F 39/8053
(Continued)

FOREIGN PATENT DOCUMENTS

CN 102507520 A 6/2012
CN 204269552 U 4/2015
(Continued)

OTHER PUBLICATIONS

International Search Report in PCT/CN2022/095784 mailed on Aug. 5, 2022, 7 pages.
(Continued)

*Primary Examiner* — Kiho Kim
(74) *Attorney, Agent, or Firm* — METIS IP LLC

(57) ABSTRACT

A system for acquiring multi-fluorescence images includes an excitation light source configured to irradiate an excitation beam onto a surface of a test sample, so that the test sample emits multi-fluorescence signals. The multi-fluorescence signals include at least two fluorescence signals. The system also includes an optical detection device configured to acquire the multi-fluorescence signals, an optical lens disposed between the optical detection device and the test sample, and a multi-band filter disposed between the optical detection device and the optical lens and/or between the test sample and the optical lens. The optical lens is configured to converge the multi-fluorescence signals emitted by the test sample to the optical detection device. The multi-band filter has at least two transmission intervals corresponding to at least two wavelength intervals of the at least two fluorescence signals. The optical detection device is configured to generate multi-fluorescence images based on the multi-fluorescence signals.

20 Claims, 5 Drawing Sheets

(58) Field of Classification Search
CPC ....... G01N 21/6458; G01N 2021/6421; G01N
2021/6471; G01N 21/6486; G01N 21/01
See application file for complete search history.

(56) References Cited

U.S. PATENT DOCUMENTS

| | | |
|---|---|---|
| 2018/0011021 A1 | 1/2018 | Shoji et al. |
| 2018/0188178 A1 | 7/2018 | Luo et al. |

FOREIGN PATENT DOCUMENTS

| | | | | |
|---|---|---|---|---|
| CN | 204945041 U | | 1/2016 | |
| CN | 206607236 U | | 11/2017 | |
| CN | 110057724 A | * | 7/2019 | ............ G02B 21/06 |
| CN | 110308127 A | | 10/2019 | |
| CN | 210378144 U | | 4/2020 | |
| CN | 113109314 A | | 7/2021 | |
| WO | 2014165879 A1 | | 10/2014 | |
| WO | 2015111349 A1 | | 7/2015 | |
| WO | WO-2019096974 A1 | * | 5/2019 | ........... G02B 21/365 |

OTHER PUBLICATIONS

Written Opinion in PCT/CN2022/095784 mailed on Aug. 5, 2022, 9 pages.
First Office Action in Chinese Application No. 202110593167.3 mailed on Feb. 25, 2022, 16 pages.
The Second Office Action in Chinese Application No. 202110593167.3 mailed on Sep. 8, 2022, 15 pages.

* cited by examiner

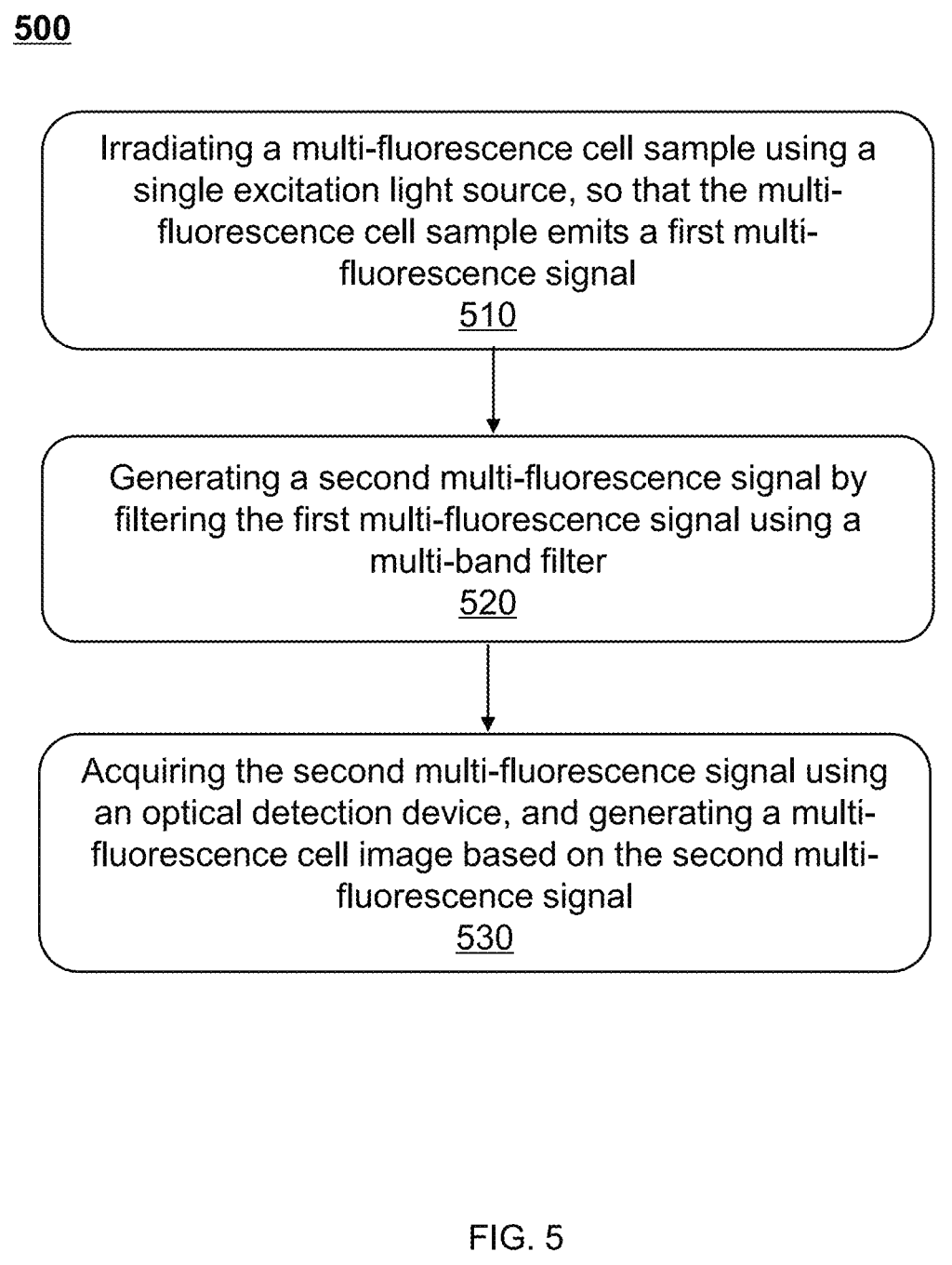

500

Irradiating a multi-fluorescence cell sample using a single excitation light source, so that the multi-fluorescence cell sample emits a first multi-fluorescence signal
510

Generating a second multi-fluorescence signal by filtering the first multi-fluorescence signal using a multi-band filter
520

Acquiring the second multi-fluorescence signal using an optical detection device, and generating a multi-fluorescence cell image based on the second multi-fluorescence signal
530

FIG. 5

MULTI-FLUORESCENCE IMAGE ACQUISITION SYSTEM AND METHOD, AND APPLICATION

CROSS-REFERENCE TO RELATED APPLICATIONS

This application is a continuation of International Application No. PCT/CN2022/095784, filed on May 27, 2022, which claims priority of the Chinese Patent Application No. 202110593167.3, filed on May 28, 2021, the entire content of each of which are hereby incorporated by reference.

TECHNICAL FIELD

The present disclosure relates to the field of in-vitro diagnostic technology, and in particular, to systems and methods for detecting multi-fluorescence signals and acquiring multi-fluorescence images and application thereof.

BACKGROUND

In detection or analysis applications at the biological cell level, the status of labeled cells may often be analyzed through fluorescence imaging. For example, in fluorescence imaging technology, samples containing fluorescent labels (e.g., cells labeled with fluorescent dyes, etc.) may emit fluorescence signals under the irradiation of an excitation light source, so that the device for detecting fluorescence signals may collect the fluorescence signals to generate corresponding fluorescence images, thereby analyzing the status of labeled cells based on the fluorescence images.

However, in practical application, multi-fluorescence imaging, e.g., the acridine orange (AO)/propidium iodide (PI) viability detection approach, is often required to analyze different properties of fluorescent labels. The device for detecting the fluorescence signals may only acquire a single fluorescence signal in one detection. Multi-fluorescence signals may only be acquired by collecting fluorescence signals for multiple times to form multi-fluorescence images. This approach leads to a complex structure and high cost of the device for detecting the fluorescence signals, resulting in difficulty of application and promotion. Therefore, it is desirable to provide systems for detecting multi-fluorescence signals with a simple structure, low cost and capable of acquiring multi-fluorescence images simultaneously.

SUMMARY

One of the embodiments of the present disclosure provides a system for acquiring multi-fluorescence images. The system may comprise an excitation light source, an optical detection device, an optical lens, and a multi-band filter. The excitation light source may be configured to irradiate an excitation beam onto a test sample, so that the test sample may emit a first multi-fluorescence signal. The first multi-fluorescence signal may include at least two fluorescence signals, and different fluorescence signals may correspond to different wavelength intervals. The optical lens may be disposed between the optical detection device and the test sample. The optical lens may be configured to converge the first multi-fluorescence signal to the optical detection device. The multi-band filter may be disposed between the optical detection device and the optical lens and/or between the test sample and the optical lens. The multi-band filter may have at least two transmission intervals corresponding to at least two wavelength intervals. The multi-band filter may be configured to filter the first multi-fluorescence signal to generate a second multi-fluorescence signal. The optical detection device may be configured to acquire the second multi-fluorescence signal and generate a multi-fluorescence image based on the second multi-fluorescence signal.

In some embodiments, the system for acquiring the multi-fluorescence images may further include a sample region for placing the test sample.

In some embodiments, a refractive index of a first light-transmitting medium may be within a range of 1.3-1.8.

In some embodiments, the excitation light source and the optical detection device may be respectively disposed on different sides of the test sample; or the excitation light source and the optical detection device may be disposed on a same side of the test sample.

In some embodiments, an incident angle of the excitation beam relative to a base may be configured such that the excitation beam deflects from the optical lens after being refracted by the first light-transmitting medium.

In some embodiments, an excitation light path may be configured in a second light-transmitting medium, and a refractive index of the second light-transmitting medium may not be equal to a refractive index of the first light-transmitting medium. The excitation light path may be a light path through which the excitation beam is incident onto the test sample.

In some embodiments, the system for acquiring the multi-fluorescence images may further include a dichroic mirror disposed between the optical lens and the multi-band filter.

In some embodiments, the dichroic mirror and the multi-band filter may form a first preset angle.

In some embodiments, the first preset angle may be within a range of 40°-50°.

In some embodiments, when the excitation light source is a monochromatic light source, the system for acquiring the multi-fluorescence images may further include an excitation filter provided between the excitation light source and the test sample. When the excitation light source is a laser light source, the system for acquiring the multi-fluorescence images may not be provided with the excitation filter.

In some embodiments, the system may include only one excitation light source.

In some embodiments, the system may include only one optical detection device.

In some embodiments, the optical lens may include an optical element or a lens group with a light converging function.

In some embodiments, the multi-band filter may be a glass slide wrapped with a multi-band filter film or a glass slide coated with a multi-band filter material.

One of the embodiments of the present disclosure provides a method for acquiring multi-fluorescence images. The method may be implemented based on the system for acquiring the multi-fluorescence images, comprising: irradiating the excitation beam to the test sample, the test sample being a measured object labeled with multiple fluorescent dyes.

In some embodiments, the measured object may be a cell sample, a protein sample, an antibody sample, a carbohydrate sample, or a drug sample.

In some embodiments, the excitation light source may be a laser light source or a monochromatic light source.

In some embodiments, wavelength intervals of the excitation beam may correspond to excitation peaks of the multiple fluorescent dyes.

In some embodiments, transmission intervals of the multi-band filter may correspond to emission bands of the multiple fluorescent dyes of the test sample, or the transmission intervals of the multi-band filter may correspond to maximum emission peaks of the multiple fluorescent dyes of the test sample.

In some embodiments, the transmission intervals of the multi-band filter may not coincide with the wavelength intervals of the excitation beam.

In some embodiments, when the system includes a base configured to place the test sample, a position of an emission end of the excitation light source relative to the base may be adjusted, so that the excitation beam emitted by the excitation light source may be vertically incident onto the base.

In some embodiments, the test sample may include at least an acridine orange (AO) fluorescent dye and a propidium iodide (PI) fluorescent dye.

In some embodiments, the excitation light source may be a monochromatic light source. The system for acquiring multi-fluorescence images may further include an excitation filter provided between the excitation light source and the test sample. A preset wavelength of the excitation filter may be within a range of 420 nm-485 nm.

In some embodiments, the preset wavelength of the excitation filter may be within a range of 465 nm-485 nm.

One of the embodiments of the present disclosure provides an application of a system for acquiring multi-fluorescence images in a field of fluorescence detection.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein:

FIG. 5 is a flowchart illustrating a process for detecting multi-fluorescence signals according to some embodiments of the present disclosure.

DETAILED DESCRIPTION

Figure 1:
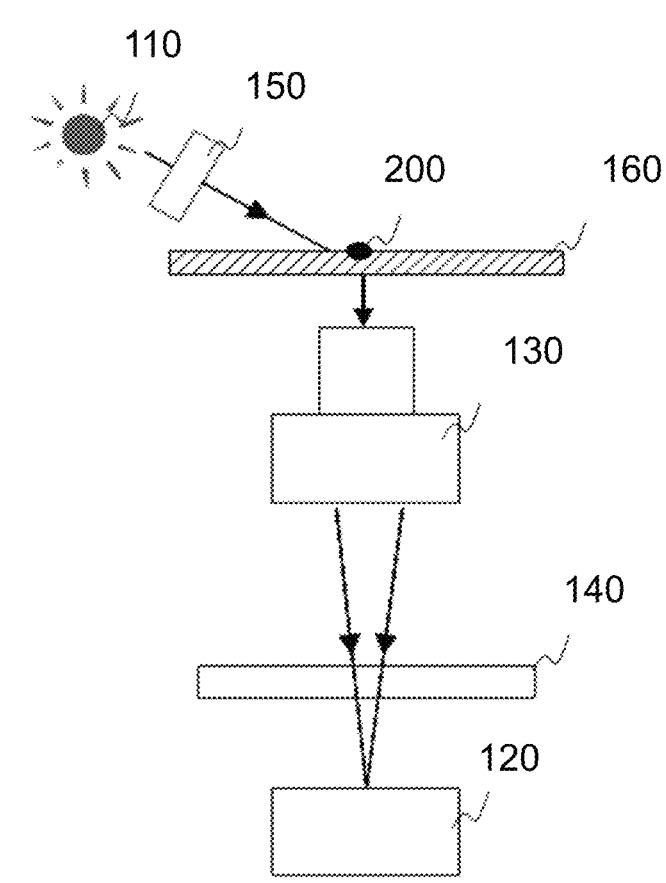
FIG. 1 is a schematic structural diagram illustrating a system for detecting multi-fluorescence signals according to some embodiments of the present disclosure.

Exemplary embodiments or implementations are described in detail herein, examples of which are illustrated in the accompanying drawings. When the following description refers to the drawings, the same numbers in different drawings refer to the same or similar elements unless otherwise indicated. The embodiments described in the following exemplary embodiments do not represent all embodiments consistent with the present disclosure. Rather, they are merely examples of apparatus and methods consistent with certain aspects of the present disclosure as detailed in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly dictates otherwise.

It should be understood that "first", "second" and similar words used in the present disclosure and claims do not indicate any order, quantity or importance, but are only used to distinguish different components. Likewise, "a" or "one" and similar words do not indicate a quantitative limit, but rather indicate the presence of at least one. Unless otherwise indicated, similar terms such as "front," "rear," "lower," and/or "upper" are for the convenience of description only and are not intended to limit one position or one spatial orientation. "Including" or "comprising" and other similar words mean that the elements or objects appearing before "including" or "comprising" cover the elements or objects listed after "including" or "comprising" and their equivalents, and do not exclude other elements or objects.

The system for detecting the multi-fluorescence signals provided by one or more embodiments of the present disclosure may be applied to various detection tasks that require fluorescence detection, such as detection of intracellular and extracellular fluorescently labeled substances, survival rate detection of fluorescently labeled cells, and activity detection of fluorescently labeled proteins, analysis of fluorescently labeled drug, etc. In some embodiments, the system for detecting the multi-fluorescence signals may acquire multi-fluorescence images of different fluorescent labels, such as multi-fluorescence images of fluorescently labeled cells, multi-fluorescence images of fluorescently labeled proteins, multi-fluorescence images of fluorescently labeled carbohydrate, multi-fluorescence images of fluorescently labeled drugs, etc.

In some embodiments, the system for detecting the multi-fluorescence signals may include an excitation light source and an optical detection device. When fluorescence detection is performed, a test sample containing a fluorescent label that needs to be detected may be irradiated by the excitation light source, so that the test sample may absorb energy and emit a fluorescence signal. The optical detection device may acquire the fluorescence signal and generate a corresponding fluorescence image. However, in practical application, in order to analyze different properties of fluorescent labels, the test sample often include multiple fluorescent labels, and the system for detecting the fluorescence signals may collect multi-fluorescence signals emitted by the fluorescent labels. In some embodiments, the system for detecting the fluorescence signals may extract a required single fluorescence signal by switching different light paths for detecting the fluorescence signals, and then generate multi-fluorescence images corresponding to all the extracted fluorescence signals. However, the detection of the multi-fluorescence signals by switching different light paths for detecting the fluorescence signals may result in a complex structure and high cost of the system for detecting the fluorescence signals, making it difficult to achieve widespread application and promotion.

The system for detecting the multi-fluorescence signals provided in one of the embodiments of the present disclosure may only include one excitation light source, one optical detection device, an optical lens, and a multi-band filter disposed between the excitation light source and the optical detection device, so that the optical lens may converge the multi-fluorescence signals and filter the multi-fluorescence signals through the multi-band filter, thereby making the optical detection device directly acquire the required multi-fluorescence signals to generate multi-fluorescence images. In this way, the system for detecting the multi-fluorescence signals may generate the multi-fluorescence images without setting up multiple detection light paths. Accordingly, the system is simple in structure and low in cost, thereby increasing the possibility of application and promotion.

Moreover, in the embodiments of the present disclosure, the fluorescent labels may be irradiated using a single excitation light source, and the required multi-fluorescence signals may be acquired simultaneously using the multi-band filter, thereby improving the problem of weakening of the fluorescence signals emitted by the fluorescence labels due to repeated and continuous irradiation, and improving the efficiency of fluorescence imaging.

It should be understood that the application scenarios of the system for detecting the multi-fluorescence signals in the present disclosure are only some examples or embodiments of the present disclosure. Those having ordinary skills in the art, without exerting creative work, may also apply the present disclosure to other similar situations according to the accompanying drawings.

FIG. 1 is a schematic structural diagram illustrating a system 100 for detecting multi-fluorescence signals according to some embodiments of the present disclosure.

In some embodiments, referring to FIG. 1, the system 100 for detecting the multi-fluorescence signals may include an excitation light source 110, an optical detection device 120, an optical lens 130, and a multi-band filter 140. The optical lens 130 and the multi-band filter 140 may be disposed between the excitation light source 110 and the optical detection device 120. In some embodiments, the multi-band filter 140 may be disposed between the optical lens 130 and the optical detection device 120. A test sample 200 may be disposed between the optical lens 130 and the excitation light source 110. In some embodiments, the multi-band filter 140 may also be disposed between the test sample 200 and the optical lens 130, and the test sample 200 may be disposed between the multi-band filter 140 and the excitation light source 110.

In some embodiments, the excitation light source 110 may emit an excitation beam to the test sample 200 containing multiple fluorescent labels. The test sample 200 may emit multi-fluorescence signals after being irradiated. The multi-fluorescence signals may include multiple fluorescence signals, and different fluorescence signals may correspond to different wavelength intervals. In some embodiments, the excitation light source 110 may emit the excitation beam to the test sample 200, so that the test sample 200 may emit the multi-fluorescence signals. In some embodiments, the optical lens 130 may also converge the multi-fluorescence signals to the optical detection device 120, so that multi-fluorescence images acquired by the optical detection device 120 may be clear. In some embodiments, the multi-band filter 140 may be disposed between the optical lens 130 and the optical detection device 120. The optical lens 130 may first converge the multi-fluorescence signals to the multi-band filter 140 and then transmit the multi-fluorescence signals to the optical detection device 120. The multi-band filter 140 may have a plurality of transmission intervals corresponding to a plurality of wavelength intervals. The multi-band filter 140 may enable light of the multi-fluorescence signals within bands corresponding to the plurality of transmission intervals to transmit through, and block light of the multi-fluorescence signals outside the transmission intervals to transmit through. The multi-fluorescence signals transmitting through the multi-band filter 140 may be transmitted to the optical detection device 120, and the optical detection device 120 may collect the multi-fluorescence signals to generate the multi-fluorescence images corresponding to the multi-fluorescence signals. In some embodiments, the multi-band filter 140 may also be disposed between the excitation light source 110 and the optical lens 130. The multi-fluorescence signals emitted by the test sample 200 may first transmit through the multi-band filter 140 and then converge to the optical detection device 120 through the optical lens 130.

In some embodiments, the system 100 for detecting the multi-fluorescence signals may include an excitation light path and a detection light path. In some embodiments, the excitation light path may be a light path through which the excitation beam emitted by the excitation light source 110 is incident onto the test sample 200. In some embodiments, the detection light path may be a light path through which the multi-fluorescence signals emitted by the test sample 200 are incident onto the optical detection device 120.

In some embodiments, the excitation light source 110 may be an object capable of emitting an excitation beam. For example, the excitation light source 110 may be a light source (such as an ultrahigh-pressure mercury lamp) that emits the excitation beam through metal vaporization. As another example, the excitation light source 110 may also be a light source (such as an arc lamp) that emits the excitation beam through an arc. As another example, the excitation light source 110 may also be a light source (such as a flame light source) that emits a laser beam through combustion of a specific substance. The excitation beam emitted by the excitation light source 110 may be configured to excite the test sample 200 to generate the multi-fluorescence signals.

In some embodiments, the excitation light source 110 may be an ordinary monochromatic light source capable of emitting a collection of light with a wavelength within a preset spectral range. For example, the excitation light source 110 may be an ordinary blue light source that emits a blue beam with a wavelength within a range of 400 nm-500 nm. In some embodiments, the spectral range, also referred to as a spectral band, is a wavelength interval between upper and lower limits of a spectral wavelength of a light beam. In some embodiments, the preset spectral range may be from 450 nm to 490 nm. Preferably, the preset spectral range may be from 465 nm to 485 nm. Preferably, a peak wavelength of the excitation beam may be approximately 470 nm.

In some embodiments, the excitation light source 110 may be a laser light source capable of emitting a laser beam with a predetermined wavelength. For example, the excitation light source 110 may be a blue laser light source that emits a blue laser beam with a wavelength of 450 nm. In some embodiments, a preset wavelength of the laser beam may be 480 nm. In some embodiments, the preset wavelength of the laser beam may be 488 nm.

In some embodiments, when the excitation light source 110 is a common monochromatic light source, the system 100 for detecting the multi-fluorescence signals may include an excitation filter 150 disposed between the excitation light source 110 and the test sample 200.

In some embodiments, the excitation filter 150 refers to a filter that only allows light beams with a preset wavelength to transmit through. In some embodiments, the excitation filter 150 may be configured to filter the excitation beam emitted by the excitation light source 110 to prevent light with other wavelengths from entering the excitation light path, ensuring monochromaticity of the excitation beam irradiating the fluorescent label. In some embodiments, a preset wavelength of the excitation filter 150 may be selected according to an excitation spectrum of the fluorescent label in the test sample 200. In some embodiments, the test sample may be an AO/PI fluorescent label, and the preset wavelength of the excitation filter may be within a range of 420 nm-485 nm. In some embodiments, the test sample may be the AO/PI fluorescent label, and the preset wavelength of the excitation filter may be within a range of 465 nm-485 nm.

Since the excitation beam emitted by the common monochromatic light source is a collection of multiple lights, the excitation beam may include light of other wavelength bands. The excitation filter 150 may be configured to filter out the light of other wavelength bands from the excitation beam, thereby ensuring the monochromaticity of the excitation beam, and improving the quality of fluorescence imaging.

In some embodiments, when the excitation light source 110 is a laser light source, the system 100 for detecting the multi-fluorescence signals may not be provided with an excitation filter. Since the laser light source has good monochromaticity, the excitation beam emitted by the laser light source is a light with a preset wavelength. The excitation beam has high monochromaticity, and the excitation filter 150 may not needed to filter out other light, thereby ensuring the quality of fluorescence imaging.

In some embodiments, the fluorescent label may be fluorescein, a fluorescent dye, or a fluorescent protein. In some embodiments, the test sample 200 may be a combination of multiple fluorescent labels and a measured object. For example, the test sample 200 may be a measured object labeled with multiple fluorescent dyes.

In some embodiments, the measured object may include, but is not limited to, a cell sample, a protein sample, an antibody sample, a carbohydrate sample, or a drug sample, etc. In some embodiments, the test sample 200 may be classified according to a type of the measured object. For example, the test sample 200 may include a multi-fluorescently labeled cell, a multi-fluorescently labeled protein, a multi-fluorescently labeled antibody, etc.

In some embodiments, the fluorescent dye refers to a substance that emits a fluorescence signal of another wavelength band after absorbing an excitation beam of a certain wavelength band. In some embodiments, the fluorescent dye may be configured to combine with the measured object to form the fluorescent label, so that a position, a quantity, a status, and other information of the measured object may be determined based on a fluorescence signal emitted by the fluorescent label. In some embodiments, the fluorescent dye may include, but is not limited to, fluorescein isothiocyanate (FITC), P-phycoerythrin (PE), propidium iodide (PI), 4',6-diamidino-2-phenylindole (DAPI), thiazole orange (TO), acridine orange (AO), etc. For example, an FITC dye may bind to an antibody and emit a green fluorescence signal, so that an amount of the corresponding antibody may be determined based on a fluorescence signal generated by the antibody labeled with the FITC dye. As another example, an AO fluorescent dye and a PI fluorescent dye may be configured to determine a survival status of a cell.

In some embodiments, the test sample 200 may include at least the AO fluorescent dye and the PI fluorescent dye. In some embodiments, the test sample 200 may be a cell sample labeled by the AO/PI. The AO fluorescent dye may penetrate through a normal cell membrane to bind to a viable cell, and the cell labeled with the AO fluorescent dye may emit a yellow-green fluorescence signal. The PI fluorescent dye may not penetrate the cell membrane and may only bind to an apoptotic cell, and the cell labeled with the PI fluorescent dye may emit a red fluorescence signal. Accordingly, a survival status of the cell may be determined based on the multi-fluorescence signals emitted by the cell labeled with the AO fluorescent dye and the cell labeled with the PI fluorescent dye.

In some embodiments, wavelength intervals of the excitation beam required for different fluorescent dyes may be different. In some embodiments, the test sample 200 may be a cell sample labeled with the AO/PI, and a wavelength interval of an excitation beam required by the cell sample may correspond to an excitation peak of the AO fluorescent dye and the PI fluorescent dye. In some embodiments, a maximum excitation peak of the AO fluorescent dye may be about 501 nm, and a maximum excitation peak of the PI fluorescent dye may be about 535 nm. In some embodiments, the wavelength interval of the excitation beam may simultaneously cover the maximum excitation peaks of the AO fluorescent dye and the PI fluorescent dye. For example, the wavelength interval of the excitation beam may be within a range of 450 nm-550 nm. In some embodiments, the wavelength interval of the excitation beam may not cover the maximum excitation peaks of the AO fluorescent dye and the PI fluorescent dye, but may be located near the maximum excitation peaks of the AO fluorescent dye and the PI fluorescent dye (e.g., ±50 nm, ±80 nm, etc.). For example, the wavelength interval of the excitation beam may be within a range of 510 nm-520 nm. In some embodiments, the excitation beam may also be a light wave of a single wavelength, and the wavelength of the light wave may be located near the maximum excitation peaks of the AO fluorescent dye and the PI fluorescent dye (e.g., ±50 nm, ±80 nm, etc.). For example, the wavelength of the excitation beam may be 488 nm.

In some embodiments, properties of fluorescence signals emitted by different fluorescent dyes may also be different. In some embodiments, the fluorescence signals emitted by the fluorescent dyes may have emission bands and maximum emission peaks. The emission bands may be wavelength intervals corresponding to the fluorescence signals emitted by the fluorescent dyes. The maximum emission peaks refer to wavelengths corresponding to light with the strongest energy of the fluorescence signals emitted by the fluorescent dyes. For example, properties of the AO fluorescence signals emitted by the AO fluorescent dye may be different from properties of the PI fluorescence signals emitted by the PI fluorescent dye. An emission band of the AO fluorescence signals may be roughly within a range of 500 nm-530 nm, and a maximum emission peak may be about 525 nm. An emission band of the PI fluorescence signals may be roughly within a range of 575 nm-620 nm, and a maximum emission peak may be 624 nm.

In some embodiments, the system for detecting the multi-fluorescence signals may also include a sample region for placing the fluorescent label. In some embodiments, the sample region may be a mechanical carrier platform for carrying a culture vessel (e.g., a culture dish, a side, etc.) on which the test sample 200 is placed. In some embodiments, the sample region may include an accommodating space for placing the test sample 200.

In some embodiments, the sample region may include a base 160 for placing the test sample 200 or a culture vessel in which the test sample 200 is placed. In some embodiments, the test sample 200 or the culture vessel may be placed on an upper surface of the base 160. In some embodiments, the base 160 may enable at least part of light to transmit through, and the fluorescence signals emitted by the test sample 200 may be transmitted to the optical lens 130 through the base 160. In some embodiments, the sample region may not include the base 160, but may include a clamp for fixing the culture vessel. When the test sample 200 is detected, it may be only required to fix the culture vessel on which the test sample 200 is placed on the base 160.

In some embodiments, the base 160 may include a first light-transmitting medium. The multi-fluorescence signals emitted by the test sample 200 may be transmitted through the first light-transmitting medium. In some embodiments, the first light-transmitting medium may be a material with good light transmittance, such as glass, plastic, agar, or the like. In some embodiments, the first light-transmitting medium may reflect and/or refract light (e.g., excitation beams, multi-fluorescence signals, etc.) incident into the first light-transmitting medium. In some embodiments, refraction and reflection of the light incident into the first light-transmitting medium may be determined based on a refractive index of the first light-transmitting medium. In some embodiments, the refractive index of the first light-transmitting medium may be within a preset range. In some embodiments, the refractive index of the first light-transmitting medium may be within a range of 1.3-1.8. In some embodiments, the refractive index of the first light-transmitting medium may be within a range of 1.4-1.8. In some embodiments, the refractive index of the first light-transmitting medium may be within a range of 1.5-1.8. In some embodiments, when the excitation beam is incident onto the test sample 200, the multi-fluorescence signals may be generated, and part of the excitation beam may transmit through the test sample 200 or be incident onto the first light-transmitting medium from an edge of the test sample 200. When the excitation beam is incident onto the first light-transmitting medium, a part of the excitation beam may be reflected to propagate toward a side where the excitation light source 110 is located, and another part of the excitation beam may be refracted to propagate toward a side opposite to the excitation light source 110. The multi-fluorescence signals emitted by the test sample 200 may be emitted in a scattering manner. After the part of the multi-fluorescence signals are incident into the first light-transmitting medium, the multi-fluorescence signals may be collected by the optical lens 130 and converged to the optical detection device 120.

In some embodiments, the optical detection device 120 refers to a device capable of generating an image corresponding to captured light, such as a camera, a photosensitive film, or another imaging device. In some embodiments, the optical detection device 120 may acquire the multi-fluorescence signals and generate multi-fluorescence images with multiple colors based on the multi-fluorescence signals, so as to subsequently analyze properties of the test sample 200 based on the multi-fluorescence images. For example, in the AOPI detection method, the optical detection device 120 may acquire AO fluorescence signals and PI fluorescence signals, and generate AO/PI fluorescence images corresponding to the AO fluorescence signals and the PI fluorescence signals. In some embodiments, a survival status of cells of multi-fluorescently labeled cells (AO/PI labeled cells) may be analyzed based on multiple colors in the AO/PI fluorescence images.

In some embodiments, the system may include only one excitation light source 110 and only one optical detection device 120. In some embodiments, a wavelength of the excitation beam emitted by the excitation light source 110 may cover maximum excitation peaks of multiple fluorescent dyes. One excitation light source 110 may simultaneously excite multiple fluorescent dyes to emit fluorescence signals. Providing only one excitation light source 110 may reduce irradiation time of the test sample 200 and prevent weakening of the multi-fluorescence signals due to too long irradiation time of the test sample 200, thereby improving the efficiency and quality of fluorescence imaging. In some embodiments, the optical detection device 120 refers to a device capable of collecting light signals and generating color images. One optical detection device 120 may generate color images of the multi-fluorescence signals. Only one optical detection device 120 may collect the multi-fluorescence signals to generate the multi-fluorescence images without setting up multiple detection light paths, thereby simplifying the structure of the system 100 for detecting the multi-fluorescence signals, thereby reducing production cost, and facilitating subsequent application and promotion.

Figure 3:
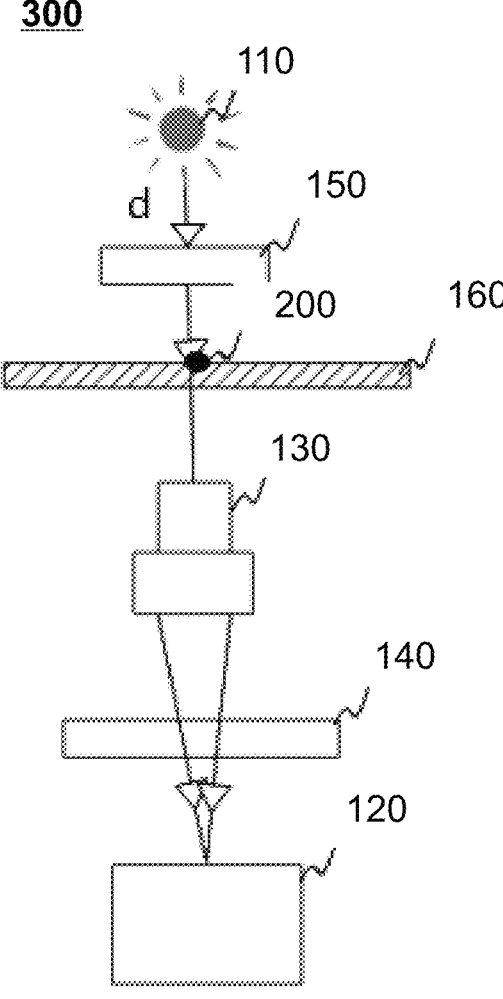
FIG. 3 is a schematic structural diagram illustrating a system for detecting multi-fluorescence signals according to some embodiments of the present disclosure.

In some embodiments, the excitation light source 110 and the optical detection device 120 may be disposed on different sides of the base 160, respectively. As shown in FIG. 1 and FIG. 3, the excitation light source 110 and the optical detection device 120 may be arranged on different sides of the base 160, so that the excitation beam and the multi-fluorescence signals do not overlap during a transmission process, and the multi-fluorescence signals may be prevented from being interfered by the excitation beam, thereby ensuring the purity of the multi-fluorescence signals, and improving the quality of the multi-fluorescence images. Moreover, the detection light paths of the system 100 for detecting the multi-fluorescence signals may be simplified, thereby avoiding attenuation of the multi-fluorescence signals during the transmission process, and improving the efficiency of fluorescence imaging.

In some embodiments, by controlling an incident angle of the excitation beam and the refractive index of the first light-transmitting medium, a propagation direction of the excitation beam after transmitting through the base 160 may be controlled. In some embodiments, the incident angle of the excitation beam relative to the base 160 may be configured such that the excitation beam deflects from the optical lens 130 after being refracted by the first light-transmitting medium. Accordingly, the optical lens 130 may not receive the light of the excitation beam, and thus the excitation beam may not enter the detection light path or may not be received by the optical detection device 120.

Figure 2:
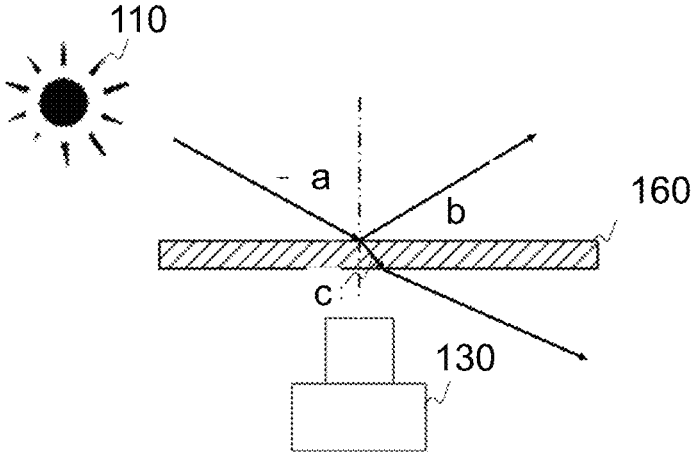
FIG. 2 is a schematic diagram illustrating a light path of a laser beam incident onto a base according to some embodiments of the present disclosure.

In some embodiments, referring to FIG. 2, by adjusting a relative position of an emission end of the excitation light source 110 to the base, an angle at which the excitation beam enters the base 160 may be adjusted. In some embodiments, an excitation beam emitted by the excitation light source 110 may be incident onto the first light-transmitting medium at a first incident angle. After the excitation beam is incident onto the first light-transmitting medium, a part of excitation beam b may be reflected, and another part of excitation beam c may be refracted. In some embodiments, the refracted excitation beam c may deflect from the optical lens 130. Accordingly, neither the reflected excitation beam nor the refracted excitation beam may enter the optical lens 130, which may prevent the optical lens 130 from collecting the excitation beam and causing interference to the multi-fluorescence signals in the detection light path, thereby improving the quality of fluorescence imaging.

In some embodiments, the excitation light path may be configured in a second light-transmitting medium. In some embodiments, a refractive index of the second light-transmitting medium may be less than the refractive index of the first light-transmitting medium. In some embodiments, the second light-transmitting medium may be air. In some embodiments, the refractive index of the second light-transmitting medium may be greater than the refractive index of the first light-transmitting medium. In some embodiments, the second light-transmitting medium may be a material with good light transmittance, such as glass, plastic, agar, quartz, or the like. In some embodiments, when the refractive index of the second light-transmitting medium is greater than the refractive index of the first light-transmitting medium, an incident angle at which the excitation beam is incident onto the first light-transmitting medium from the second light-transmitting medium may be greater than or equal to a critical angle of total reflection. Accordingly, the excitation beam incident onto the first light-transmitting medium may be completely reflected at the base 160 after exciting the test sample 200, thereby preventing the excitation beam from entering the optical lens 130.

In some embodiments, the optical lens 130 may be disposed between the test sample 200 and the optical detection device 120. In some embodiments, the optical lens 130 may be disposed between the base 160 and the optical detection device 120. In some embodiments, the optical lens 130 may also include an optical element with a function of converging light, such as a convex lens. In some embodiments, the optical lens 130 may include a lens group with a function of converging light. For example, the optical lens 130 may include a combination of a convex lens and a concave lens capable of gathering more light of the multi-fluorescence signals. In some embodiments, the optical lens 130 may have an optical magnification function. In some embodiments, the optical lens 130 may have an optical microscopy function. The optical lens 130 may also be implemented in other ways, which are not specifically limited in the embodiments of the present disclosure. The optical lens 130 may gather and amplify the multi-fluorescence signals emitted by the test sample 200, and transmit the converged multi-fluorescence signals to the optical detection device 120, thereby improving a signal intensity of the multi-fluorescence signals, preventing failure to imaging caused by attenuation of the multi-fluorescence signals during the transmission process, and improving the efficiency of fluorescence imaging.

In some embodiments, the multi-band filter 140 may allow light of different wavelength intervals (e.g., transmission intervals) to transmit through a multi-band slide, while blocking light of other wavelengths to transmit through the multi-band slide. In some embodiments, the multi-band filter 140 may allow the multi-fluorescence signals to transmit through while blocking other signals, so that the optical detection device 120 may collect the multi-fluorescence signals simultaneously to generate the multi-fluorescence images in one fluorescence detection. In some embodiments, the multi-band filter 140 may be a slide wrapped with a multi-band filter film. In some embodiments, the multi-band filter 140 may be a slide coated with a multi-band filter material. A transmission interval of the multi-band filter 140 may also be implemented in other ways, which are not specifically limited in the embodiments of the present disclosure.

In some embodiments, the transmission intervals of the multi-band filter 140 may be wavelength intervals of light allowed to transmit through the multi-band filter 140. The transmission intervals may be determined according to the wavelength intervals of the multi-fluorescence signals. In some embodiments, the transmission intervals of the multi-band filter 140 may correspond to emission bands of multiple fluorescent dyes of the test sample 200. For example, the multi-fluorescence signals may include AO fluorescence signals and PI fluorescence signals, and the transmission intervals of the multi-band filter 140 may include a range of 500 nm-530 nm and a range of 575 nm-620 nm. In some embodiments, the transmission intervals of the multi-band filter 140 may also correspond to maximum emission peaks of multiple fluorescent dyes of the test sample 200.

By setting the multi-band filter 140, the light of multiple fluorescence bands of the multi-fluorescence signals may simultaneously transmit through, so that one optical detection device 120 may receive the light of multiple bands of the multi-fluorescence signals simultaneously, simplifying the structure of the detection optical path, and reducing the cost of the system 100 for detecting the multi-fluorescence signals.

FIG. 3 is a schematic structural diagram illustrating a system 300 for detecting multi-fluorescence signals according to some embodiments of the present disclosure.

Referring to FIG. 3, in some embodiments, by adjusting a position of an emission end of the excitation light source 110 relative to the base 160, an angle at which an excitation beam is incident onto the base 160 may be adjusted, so that an excitation beam d emitted by the excitation light source 110 may be vertically incident onto the base. After the excitation beam is incident onto the base, the excitation beam may directly transmit through a first light-transmitting medium of the base, which may simplify a detection light path, avoid failure to imaging caused by attenuation of multi-fluorescence signals during a transmission process, and improve the efficiency of fluorescence imaging.

In some embodiments, the substrate 160 may further include a filter film layer. A transmission interval of the filter film layer may not coincide with a wavelength interval of the excitation beam d.

In some embodiments, the filter film layer may be a film layer that changes a spectral composition, and only allows light with a wavelength within the transmission interval to transmit through and prevents light with a wavelength outside a preset transmission interval to transmit through. In some embodiments, the transmission interval of the filter film layer may not coincide with the wavelength interval of the excitation beam d, i.e., the wavelength of the excitation beam d may not be within the transmission interval. The filter film layer may prevent the excitation beam d incident onto the base 160 from transmitting through, to prevent the optical lens 130 from collecting optical signals of the excitation beam d to cause interference to the multi-fluorescence signals, thereby improving the quality of fluorescence imaging.

In some embodiments, the filter film layer may be made of polyethylene terephthalate (PET) or polyethylene (PE). The filter film layer may also be made of other materials, which are not specifically limited in the embodiments of the present disclosure.

Figure 4:
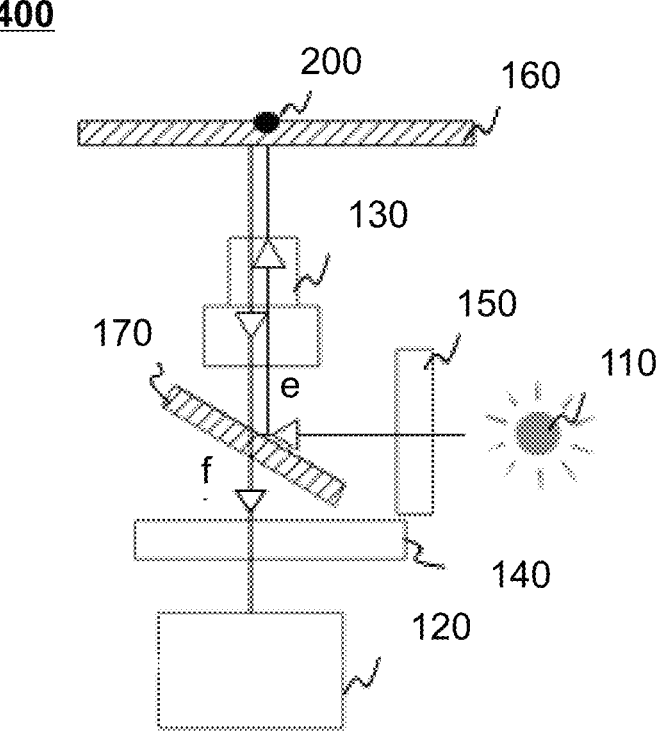
FIG. 4 is a schematic structural diagram illustrating a system for detecting multi-fluorescence signals according to some embodiments of the present disclosure.

FIG. 4 is a schematic structural diagram illustrating a system 400 for detecting multi-fluorescence signals according to some embodiments of the present disclosure.

In some embodiments, referring to FIG. 4, the system 400 for detecting the multi-fluorescence signals may include the excitation light source 110, the optical detection device 120, the optical lens 130, the base 160, the dichroic mirror 170, and the multi-band filter 140. In some embodiments, the excitation light source 110 and the optical detection device 120 may be disposed on a same side of the base 160 respectively. In some embodiments, the optical lens 130 and the multi-band filter 140 may be sequentially disposed between the test sample 200 and the optical detection device 120. The optical lens 130 may be disposed at an end close to the test sample 200, and the multi-band filter 140 may be disposed at an end close to the optical detection device 120. The dichroic mirror 170 may be disposed between the optical lens 130 and the multi-band filter 140. The excitation light source 110 may be disposed on a side of the dichroic mirror 170.

In some embodiments, the dichroic mirror 170 is an optical element capable of changing a direction of partial spectral light path, so that light within a specific wavelength interval may almost completely transmit through, while light within another specific wavelength interval may almost be completely reflected. In some embodiments, the dichroic mirror 170 may be a glass slide covered with a dichroic film. In some embodiments, the dichroic film may be disposed on a side of the glass slide close to the excitation light source 110, so that an excitation beam reflected by the dichroic mirror 170 may be irradiated to the base 160 of the test sample 200.

In some embodiments, the dichroic mirror 170 may be configured to reflect the excitation beam and transmit multi-fluorescence signals. In some embodiments, as shown in FIG. 4, after the excitation beam is incident onto the dichroic mirror 170, the dichroic mirror 170 may reflect the excitation beam to irradiate the base 160 of the test sample 200. Reflected light of the excitation beam may be light e shown in FIG. 4. After the multi-fluorescence signals are incident onto the dichroic mirror 170, the dichroic mirror 170 enables the multi-fluorescence signals to transmit to the optical detection device 120. Transmitted light of the multi-fluorescence signals may be light f shown in FIG. 4. In some embodiments, a specific wavelength interval of the reflected light of the dichroic mirror 170 may be determined based on a wavelength interval of the excitation beam, and a specific wavelength interval of the transmitted light of the dichroic mirror 170 may be determined based on a wavelength interval of the multi-fluorescence signals. For example, if the wavelength interval of the excitation beam is within a range of 465 nm-485 nm, the wavelength interval of AO fluorescence signals is within a range of 500-530 nm, and the wavelength interval of PI fluorescence signals is within a range of 575-620 nm, the dichroic mirror 170 may reflect light with a wavelength interval below 490 nm and transmit light with a transmission wavelength interval of 490 nm and light with a transmission wavelength interval greater than 490 nm. Transmission and reflection properties of the dichroic mirror 170 may also be realized in other ways, which are not specifically limited in the embodiments of the present disclosure.

In some embodiments, the dichroic mirror 170 and the multi-band filter 140 may form a first preset angle. Preferably, the first preset angle may be within a range of 40°-50°. Preferably, the first preset angle may be 45°. In this way, after the excitation beam is incident onto the dichroic mirror 170, the dichroic mirror 170 may reflect the excitation beam to irradiate onto the base 160 on which the test sample 200 is placed, thereby achieving a change from a ground state to an excited state of the test sample 200.

In some embodiments, the excitation light source 110 and the optical detection device 120 may be disposed on the same side of the base 160, respectively. With such an arrangement, an incident side of the excitation beam may be the same as an emergent side of the multi-fluorescence signals, so that space occupied by the detection light path may be reduced, and a volume of the system 400 for detecting the multi-fluorescence signals may be reduced by overlapping transmission paths of the excitation light and the multi-fluorescence signals, thereby improving the portability of the system 400 for detecting the multi-fluorescence signals. In addition, the excitation beam may be incident onto the base 160 from the side of the optical detection device 120 and then emergent from another side, which prevents the excitation beam from entering the detection light path, thereby improving the imaging quality of multi-fluorescence images.

FIG. 5 is a flowchart illustrating a process for detecting multi-fluorescence signals according to some embodiments of the present disclosure.

In some embodiments, a process 500 may include the following operations.

In 510, a multi-fluorescence cell sample may be irradiated using a single excitation light source, so that the multi-fluorescence cell sample emits a first multi-fluorescence signal.

In some embodiments, the single excitation light source may be the excitation light source 110. Detailed descriptions regarding the excitation light source 110 may be found in the related descriptions of FIG. 1, which are not repeated here. The multi-fluorescence cell sample may be a cell sample labeled with multiple fluorescence labels. For example, the multi-fluorescence cell sample may be a dual-fluorescence cell sample labeled with an AO fluorescent dye and a PI fluorescent dye. In some embodiments, the first multi-fluorescence signal may be a multi-fluorescence signal emitted by the multiple fluorescence labels in the multi-fluorescence cell sample. In some embodiments, the first multi-fluorescence signal may include at least two fluorescence signals. Different fluorescence signals may correspond to different wavelength intervals. That is, the first multi-fluorescence signal may include multiple fluorescence signals of different wavelengths. For example, in an AOPI test approach, the first multi-fluorescence signal may include an AO fluorescence signal and a PI fluorescence signal.

In some embodiments, the multi-fluorescence cell sample may be irradiated by the excitation beam emitted by the single excitation light source, so that the multiple fluorescence labels in the multi-fluorescence cell sample may absorb energy, and the multiple fluorescence labels may change from the ground state to the excited state. Accordingly, when the multiple fluorescence labels change from the excited state to the ground state, the multiple fluorescence labels may simultaneously emit multiple fluorescence signals, i.e., the first multi-fluorescence signal.

In some embodiments, the first multi-fluorescence signal may also include an optical signal with the excitation beam. In some embodiments, the first multi-fluorescence signal may also include an ambient light signal.

In 520, a second multi-fluorescence signal may be generated by filtering the first multi-fluorescence signal using the multi-band filter.

In some embodiments, detailed descriptions regarding the multi-band optical filter may be found in the related descriptions of FIG. 1, which are not repeated here. The second multi-fluorescence signal may be a multi-fluorescence signal filtered by the multi-band filter. Compared with the first multi-fluorescence signal, the second multi-fluorescence signal has higher purity and fewer interference signals. For example, in the AOPI test approach, the second multi-fluorescence signal may include the AO fluorescence signal and the PI fluorescence signal filtered by the multi-band filter.

In some embodiments, the multi-band filter may filter the first multi-fluorescence signal, which may prevent the light of the first multi-fluorescence signal with a wavelength outside the transmission interval of the multi-band filter from passing through, and allow the light of the first multi-fluorescence signal with a wavelength within the transmission interval of the multi-band filter to pass through. For example, the transmission interval of the multi-band filter may be within a range of 500 nm-530 nm and 575 nm-620 nm, then the AO fluorescence signal and PI fluorescence signal of the first multi-fluorescence signal may pass through the multi-band filter. The second multi-fluorescence signal may include a filtered AO fluorescence signal and a filtered PI fluorescence signal.

In 530, the second multi-fluorescence signal may be acquired using an optical detection device, and a multi-fluorescence cell image may be generated based on the second multi-fluorescence signal.

In some embodiments, detailed descriptions regarding optical detection device may be found in the related descriptions of FIG. 1, which are not repeated here. In some embodiments, the multi-fluorescence cell image may be an image with multiple colors generated based on the multi-fluorescence signals, which may reflect a labeled status or attributes of the multi-fluorescence cell sample. For example, an AOPI fluorescence image may be generated based on the AO fluorescence signal and the PI fluorescence signal. Survival statuses of cells may be reflected based on different colors on the AOPI fluorescence image. If the cells present red on the AOPI fluorescence image, it means that the cells are in a state of apoptosis. If the cells present yellow-green on the AOPI fluorescence image, it means that the cells are in an active state.

In some embodiments, the optical detection device may acquire the second multi-fluorescence signal through a built-in photosensitive element and convert the second multi-fluorescence signal from an optical signal into an electrical signal, thereby generating the multi-fluorescence cell image. In some embodiments, the optical detection device may generate the multi-fluorescence cell image by simulating the brightness of an optical image based on a size of the second multi-fluorescence signal. The multi-fluorescence cell image may also be generated in other ways, which are not limited in the embodiments of the present disclosure.

In some embodiments, after the multi-fluorescent cell image is generated by the system 100 for detecting the multi-fluorescence signals, cells of different colors in the image may be recognized through an image recognition algorithm, thereby determining the attributes or status of the multi-fluorescent cell sample.

The beneficial effects that may be brought about by the embodiments of the present disclosure include but are not limited to the following. (1) The multi-fluorescence image may be generated without setting up multiple detection light paths. The system is simple and the cost is low, which increases the possibility of application and promotion. (2) Repeated fluorescence detection is not required. Cell images containing two fluorescence channel information may be acquired simultaneously in one fluorescence detection, which improves the efficiency of fluorescence imaging. (3) The single excitation light source may reduce the irradiation duration and prevent the weakening of the multi-fluorescence signals of the test sample due to too long irradiation time, thereby improving the efficiency of fluorescence imaging.

It should be noted that different embodiments may produce different beneficial effects. In different embodiments, the possible beneficial effects may be any one or a combination of the above, or any other possible beneficial effects.

The basic concepts have been described above. It is obvious to those skilled in the art that the above detailed disclosure is only an example and does not constitute a limitation of the present disclosure. Although not explicitly stated herein, various modifications, improvements, and corrections may be made to the present disclosure by those skilled in the art. Such modifications, improvements, and corrections are suggested in the present disclosure, thus such modifications, improvements, and corrections remain within the spirit and scope of the exemplary embodiments of the present disclosure.

In addition, the present disclosure uses specific words to describe the embodiments of the present disclosure. For example, "one embodiment," "an embodiment," and/or "some embodiments" means a certain feature, structure, or characteristic related to at least one embodiment of the present disclosure. Therefore, it should be noted that "one embodiment," "an embodiment," or "an alternative embodiment" mentioned twice or more at different places of the present disclosure does not necessarily refer to the same embodiment. Furthermore, certain features, structures or characteristics in one or more embodiments of the present disclosure may be appropriately combined.

What is claimed is:

1. A system for acquiring multi-fluorescence images, comprising an excitation light source, an optical detection device, an optical lens, and a multi-band filter; wherein the excitation light source is configured to irradiate an excitation beam onto a test sample, so that the test sample emits a first multi-fluorescence signal, the first multi-fluorescence signal including at least two fluorescence signals, and different fluorescence signals corresponding to different wavelength intervals;

the optical lens is disposed between the optical detection device and the test sample, and the optical lens is configured to converge the first multi-fluorescence signal to the optical detection device;

the multi-band filter is disposed between the optical detection device and the optical lens and/or between the test sample and the optical lens, the multi-band filter has at least two transmission intervals corresponding to at least two wavelength intervals, and the multi-band filter is configured to filter the first multi-fluorescence signal to generate a second multi-fluorescence signal;

the optical detection device is configured to acquire the second multi-fluorescence signal and generate a multi-fluorescence image based on the second multi-fluorescence signal;

the system further comprises a sample region for placing the test sample, wherein the sample region includes a base; the base is configured to place the test sample; and the base includes a first light-transmitting medium;

an excitation light path is configured in a second light-transmitting medium, a refractive index of the second light-transmitting medium is not equal to a refractive index of the first light-transmitting medium, and the excitation light path is a light path through which the excitation beam is incident onto the test sample.

2. The system of claim 1, wherein a refractive index of the first light-transmitting medium is within a range of 1.3-1.8.

3. The system of claim 1, wherein the excitation light source and the optical detection device are respectively disposed on different sides of the test sample; or the excitation light source and the optical detection device are disposed on a same side of the test sample.

4. The system of claim 1, wherein an incident angle of the excitation beam relative to the base is configured such that the excitation beam deflects from the optical lens after being refracted by the first light-transmitting medium.

5. The system of claim 1, further comprising a dichroic mirror disposed between the optical lens and the multi-band filter.

6. The system of claim 5, wherein the dichroic mirror and the multi-band filter form a first preset angle.

7. The system of claim 6, wherein the first preset angle is within a range of 40°-50°.

8. The system of claim 1, wherein when the excitation light source is a monochromatic light source, the system further includes an excitation filter provided between the excitation light source and the test sample; and when the excitation light source is a laser light source, the system is not provided with the excitation filter.

9. The system of claim 1, wherein the system includes only one excitation light source.

10. The system of claim 1, wherein the system includes only one optical detection device.

11. The system of claim 1, wherein the optical lens includes an optical element or a lens group with a light converging function.

12. The system of claim 1, wherein the multi-band filter is a glass slide wrapped with a multi-band filter film or a glass slide coated with a multi-band filter material.

13. A method for acquiring multi-fluorescence images, implemented based on a system for acquiring multi-fluorescence images, wherein the system comprises: an excitation light source, an optical detection device, an optical lens, and a multi-band filter; wherein the excitation light source is configured to irradiate an excitation beam onto a test sample, so that the test sample emits a first multi-fluorescence signal, the first multi-fluorescence signal including at least two fluorescence signals, and different fluorescence signals corresponding to different wavelength intervals;

the optical lens is disposed between the optical detection device and the test sample, and the optical lens is configured to converge the first multi-fluorescence signal to the optical detection device;

the multi-band filter is disposed between the optical detection device and the optical lens and/or between the test sample and the optical lens, the multi-band filter has at least two transmission intervals corresponding to at least two wavelength intervals, and the multi-band filter is configured to filter the first multi-fluorescence signal to generate a second multi-fluorescence signal;

the optical detection device is configured to acquire the second multi-fluorescence signal and generate a multi-fluorescence image based on the second multi-fluorescence signal;

the method comprises: irradiating the excitation beam to the test sample, the test sample being a measured object labeled with multiple fluorescent dyes;

the system further comprises a sample region for placing the test sample, wherein the sample region includes a base; the base is configured to place the test sample; and the base includes a first light-transmitting medium;

an excitation light path is configured in a second light-transmitting medium, a refractive index of the second light-transmitting medium is not equal to a refractive index of the first light-transmitting medium, and the excitation light path is a light path through which the excitation beam is incident onto the test sample.

14. The method of claim 13, wherein the excitation light source is a laser light source or a monochromatic light source.

15. The method of claim 13, wherein wavelength intervals of the excitation beam correspond to excitation peaks of the multiple fluorescent dyes.

16. The method of claim 13, wherein transmission intervals of the multi-band filter correspond to emission bands of the multiple fluorescent dyes of the test sample, or the transmission intervals of the multi-band filter correspond to maximum emission peaks of the multiple fluorescent dyes of the test sample.

17. The method of claim 13, wherein the transmission intervals of the multi-band filter do not coincide with the wavelength intervals of the excitation beam.

18. The method of claim 13, wherein the measured object is a cell sample, a protein sample, an antibody sample, a carbohydrate sample, or a drug sample.

19. The method of claim 13, wherein a position of an emission end of the excitation light source relative to the base is adjusted, so that the excitation beam emitted by the excitation light source is vertically incident onto the base.

20. The method of claim 14, wherein the test sample includes at least an acridine orange (AO) fluorescent dye and a propidium iodide (PI) fluorescent dye.

* * * * *